United States Patent [19]
Chang et al.

[11] Patent Number: 5,854,173
[45] Date of Patent: Dec. 29, 1998

[54] FLAKE SHAPED SORBENT PARTICLE FOR REMOVING VAPOR PHASE CONTAMINANTS FROM A GAS STREAM AND METHOD FOR MANUFACTURING SAME

[75] Inventors: Ramsay Chang, Los Altos, Calif.; Massoud Rostam-Abadi, Champaign, Ill.

[73] Assignee: Electric Power Research Institute, Inc., Palo Alto, Calif.

[21] Appl. No.: 657,818

[22] Filed: May 31, 1996

[51] Int. Cl.$^6$ .................................................... B01J 20/02
[52] U.S. Cl. ........................ 502/417; 502/416; 502/418; 502/182; 502/184; 502/400; 95/108; 95/134; 55/262
[58] Field of Search ................................... 502/180, 416, 502/417, 400, 182, 184, 418; 95/108, 134; 55/262

[56] References Cited

U.S. PATENT DOCUMENTS

| | | | |
|---|---|---|---|
| 4,093,541 | 6/1978 | Piccinini et al. | 210/40 |
| 4,626,354 | 12/1986 | Hoffman et al. | 210/603 |
| 5,190,908 | 3/1993 | Audeh et al. | 502/400 |
| 5,196,380 | 3/1993 | Shadman | 502/416 |
| 5,209,773 | 5/1993 | Audhe et al. | 95/134 |
| 5,346,876 | 9/1994 | Ichimura et al. | 502/417 |
| 5,350,728 | 9/1994 | Cameron et al. | 502/417 |
| 5,505,766 | 4/1996 | Chang . | |
| 5,540,896 | 7/1996 | Newby | 422/172 |

OTHER PUBLICATIONS

Abstract for J.J. Colling, et al., "The Purasieve Hg Process for Mercury Removal and Recovery from Vent Gas Streams," (1972) Presented at the 65th Annual APCA Meeting, Miami Beach, FL.

J.T. Chesake, "Testing of a Molecular Sieve Used to Control Mercury Emissions from a Chlor–Alkali Plant," (1975) EPA/650/275–026 a & b.

Environmental Protection Agency, "Handbook — Control Technologies for Hazardous Air Pollutants," (Sep. 1986) EPA/625/6–86/014.

X.T. Nguyen, "Adsorbents for Mercury Vapor Removal," (Mar. 1979) J. Air Pollution Control Assn., V29, No. 3, p. 235.

J.D. Kilgroe, et al., "Camden County MWC Carbon Injection Test Results," (Mar. 20 to Apr. 2, 1993) US EPA and the Air and Waste Management Assn., Williamsburg, VA.

Chang, et al., "Pilot–Scale Evaluation of AC for the Removal of Mercury at Coal–Fired Utility Power Plants," (Sep. 1993) Proceedings: 2nd Intl. Conference on managing Hazardous Air Pollutants, EPRI TR–104295.

*Primary Examiner*—Glenn Caldarola
*Assistant Examiner*—In Suk Bullock
*Attorney, Agent, or Firm*—Flehr Hohbach Test Albritton & Herbert LLP

[57] ABSTRACT

A method for removing vapor phase contaminants from a gas stream. Sorbent particles are injected into the gas stream to react with vapor phase contaminants in the gas stream. Each sorbent particle is made from a support particle of a material coated with a layer of sorbent material different than the material of the support particle. The gas stream is directed through a particulate control device to remove the sorbent particles from the gas stream. A sorbent particle for use in the method and a method for manufacture of the sorbent particle are provided.

9 Claims, 2 Drawing Sheets

FLAKE SHAPED SORBENT PARTICLE FOR REMOVING VAPOR PHASE CONTAMINANTS FROM A GAS STREAM AND METHOD FOR MANUFACTURING SAME

BRIEF DESCRIPTION OF THE INVENTION

This invention relates to the removal of contaminants from a gas stream and more particularly to the removal of trace amounts of vapor phase contaminants such as mercury from the flue gas of a combustor.

BACKGROUND OF THE INVENTION

The emission of air toxics from combustion sources is an important issue in light of the 1990 Clean Air Act Amendments. Title III of these amendments governs air toxics. Air toxics are present in the flue gas of combustion sources and appear both as particulate metals such as nickel, arsenic and chromium in the fly ash particles and as vapor phase metals such as mercury, selenium and halides and organic vapors. Vapor phase air toxics are present in flue gas in trace concentrations of parts per million or less and are thus difficult to remove.

One approach for removing vapor phase air toxics is to pass the gas stream through a packed bed of sorbent. Packed-bed absorbers typically use activated carbon for collecting mercury. The zeolitic material Purasieve Hg-molecular sieve has also been used as a mercury-control measure on Chlor-Alkali emissions. See J. J. Collins, W. C. Miller and J. E. Philcox; "The Purasieve Hg Process for Mercury Removal and Recovery From Vent Gas Streams", Presented at the 65th Annual APCA Meeting, Miami Beach, Fla., 1972 and J. T. Chesake; "Testing of a Molecular Sieve Used to Control Mercury Emissions From a Chlor-Alkali Plant", EPA/650/275-026 a & b, 1975. Sulfur-impregnated activated carbon has been found to remove 90% of mercury vapor, forming mercuric sulfide. See Environmental Protection Agency; "Handbook—Control Technologies for Hazardous Air Pollutants", EPA/625/6-86/014, September 1986. In large industrial-scale operations for which the objective is to collect mercury from contaminated-gas sources in an economical manner, materials such as the following have been developed: activated carbon coated with silver, sulfur or interhalogen compounds, and aluminum oxide coated with silver. See X. T. Nguyen; "Adsorbents for Mercury Vapor Removal"; J. Air Pollution Control Assn., v.29, no. 3, pp. 235, March 1979. Packed beds, however, have several limitations. They are complex to design and operate. In addition, they produce high pressure drops and require periodic regeneration.

Chang (U.S. Pat. No. 5,505,766) discloses a method for removing vapor phase air toxics from a combustor flue gas in which the flue gas is passed through a baghouse having a filter bag coated with a layer of a predetermined amount of sorbent. The sorbent layer provides a high ratio of sorbent to vapor phase air toxics on the filter bag for facilitating intimate contact between the sorbent and the vapor phase air toxics and thus enhancing the sorbing of vapor phase air toxics from the flue gas.

Alternatively, sorbents such as activated carbon have been injected directly into a gas stream to absorb trace amounts of vapor mercury. For example, activated carbon has been injected into the ductwork after the air heater of a coal-fired boiler where it is collected in a downstream particulate collector such as an electrostatic precipitator (ESP) or a baghouse used to collect fly ash from the coal combustion. Direct injection of activated carbon has been tested on a waste incinerator facility. See J. D. Kilgroe et al.; "Camden County MWC Carbon Injection Test Results", 1993 International Conference on Municipal Waste Combustions, U.S. EPA and the Air and Waste Management Association, Williamsburg, Va., Mar. 20 to Apr. 2, 1993. Pilot evaluation of carbon injection in a utility boiler flue gas has showed mixed results. See R. Chang et al.; "Pilot-Scale Evaluation of AC for the Removal of Mercury at Coal-Fired Utility Power Plants", Proceedings: 2nd International Conference on Managing Hazardous Air Pollutants, EPRI TR104295, September 1993.

OBJECTS AND SUMMARY OF THE INVENTION

The primary object of the present invention is to provide a method for removing vapor phase air toxics from a gas stream.

Another object of the invention is to provide a method of the above character for removing mercury from flue gas of a combustor.

Another object of the invention is to provide a method of the above character which maximizes the external sorbent area available for reacting with mercury in the flue gas.

Another object of the invention is to provide a method of the above character which improves sorbent utilization and thereby reduces the amount of sorbent injected into the flue gas.

Another object of the invention is to provide a method of the above character which utilizes a sorbent particle having a support particle coated with a thin layer of sorbent material for injection into the flue gas.

Another object of the invention is to provide a sorbent particle of the above character in which the support particle is formed from a relatively inexpensive material.

Another object of the invention is to provide a sorbent particle of the above character in which the support particle has a high outer surface area to volume ratio.

Another object of the invention is to provide a method for manufacture of a sorbent particle of the above character.

These and other objects are achieved by a method for removing vapor phase contaminants from a gas stream. Sorbent particles are injected into the gas stream to react with vapor phase contaminants in the gas stream. Each sorbent particle is made from a support particle of a material coated with a layer of sorbent material different than the material of the support particle. The gas stream is directed through a particulate control device to remove the sorbent particles from the gas stream. A sorbent particle for use in the method and a method for manufacture of said sorbent particle are provided.

Additional objects and features of the invention will appear from the following description from which the preferred embodiments are set forth in detail in conjunction with the accompanying drawings.

DETAILED DESCRIPTION OF THE INVENTION

Figure 1:
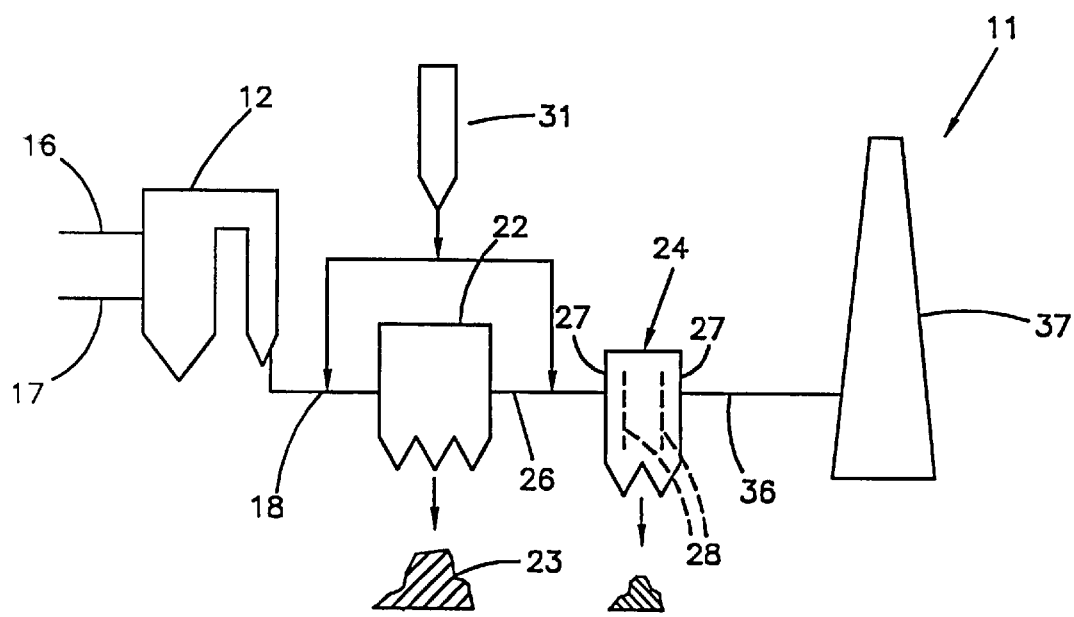
FIG. 1 is a schematic view of a system for removing pollutants from a combustor flue gas incorporating the method of the present invention.

Reference will now be made in detail to the preferred embodiments of the invention which are illustrated in the accompanying figures. The description of the embodiments of the invention will be followed by a discussion of their operation.

Pollutant removal system 11 of the present invention is for use with a combustion source such as a fossil-fuel-fired boiler 12 which receives air through air inlet duct 16 to combust fuel such as coal received through fuel inlet duct 17. The combustion process within boiler 12 produces a gas stream in the form of flue gas which exits the boiler through outlet duct 18. The flue gas produced within the boiler is comprised of air, products of combustion in the gaseous form such as water vapor, carbon dioxide, oxides of nitrogen and sulfur, halides, organic compounds, mercury, selenium and other trace metal vapors and particulate matter.

System 11 includes a primary particulate control device or collector such as electrostatic precipitator or ESP 22 which is coupled to boiler 12 via outlet duct 18. ESP 22 serves to, among other things, remove particulate matter such as fly ash particles 23 from the flue gas. These particles 23 are discharged from the ESP as shown in FIG. 1. An additional particulate control device or collector such as baghouse 24 is situated downstream from ESP 22 and is coupled thereto by connector duct 26. Baghouse 24 is comprised of multiple compartments each having a plurality of filter bags 28 therein. One filter bag 28 is illustrated for each of the two compartments 27 in FIG. 1. System 11 further includes a silo 31 which carries a sorbent for introduction into the flue gas upstream of a particulate control device. More specifically, the sorbent is introduced into outlet duct 18 upstream of ESP 22 and also into connector duct 26 upstream of baghouse 24. Means including at least one fan (not shown), at least one valve (not shown) and a controller (not shown) coupled to the fan and valve are provided for controlling the timing and amount of sorbent introduced into system 11. The used sorbent 32 is discharged from baghouse 24. Treated flue gas exits baghouse 24 through exit duct 36 to a stack 37, which dispels the flue gas into the atmosphere.

Figure 2:
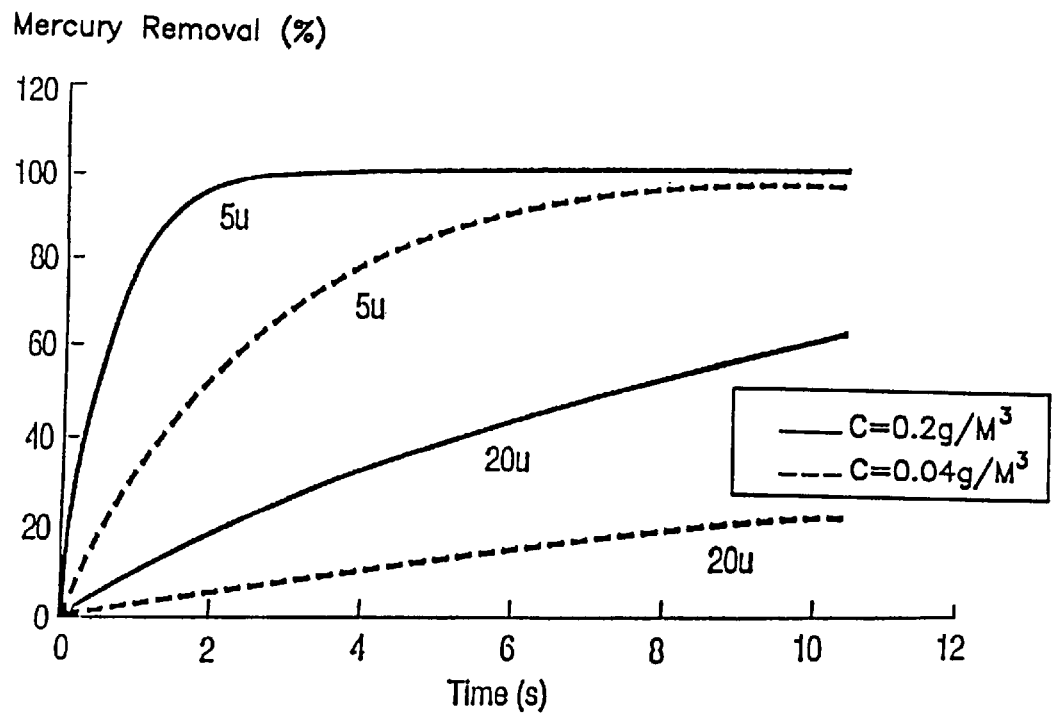
FIG. 2 is a graph of hypothetical curves, corresponding to different sorbent concentrations and sizes, depicting the percentage of mercury removal as a function of time.

As indicated above, injection of sorbents such as activated carbon appear to be a promising option for removing trace amounts of vapor phase air toxics such as mercury from gas streams. FIG. 2 shows the results of a theoretical analysis for mercury removal with sorbent injection under mass transfer limited conditions. Activated carbon, which is somewhat spherical in shape, is the sorbent utilized in the analysis summarized in FIG. 2. As can be seen therein, long sorbent gas contact times, large amounts of sorbents or small sorbent size are needed to maximize mercury capture. In order to achieve greater than 80% mercury capture, a sorbent size of approximately 5 microns is needed. At a sorbent size of 20 microns, high carbon concentrations and residence times much greater than 10 seconds are needed to achieve greater than 80% mercury capture. In practice, long residence or contact times are undesirable and in many cases not possible since achievement of such extended times would require long duct runs. For example, the residence time of the flue gas traveling through duct 18 upstream of ESP 22 is approximately one second.

It is believed that much of the internal surfaces of highly porous sorbent particles such as activated carbon may not be used due to mass transfer limitations. Accordingly, it is desirable to maximize the external surface area of the sorbent particles so as to enhance mass transfer. This can be achieved by either injecting large amounts of sorbent and/or by injecting sorbent particles which are smaller in size into the flue gas. As can be appreciated, for a given mass of activated carbon the aggregate outer surface area is greater for a plurality of relatively small sized particles than for a plurality of relatively larger sized particles.

Introducing large amounts of sorbents into a flue gas increases the cost of pollutant removal dramatically because such large amounts decrease the effectiveness of downstream particulate collection equipment. For example, large amounts of activated carbon have been found to downgrade ESP collection efficiency due to carbon's very low electrical resistivity. The use of small sized sorbent particles is also not without problems. Small particle size is normally achieved by grinding sorbents such as activated carbon to very fine sizes. This grinding process is energy intensive and thus costly. In addition, smaller sized sorbent particles are difficult to collect in particulate collection devices. Furthermore, these small sorbent particles have the added problem of creating a filter cake with a very high pressure drop thereacross on the filters of baghouses.

Figure 3:
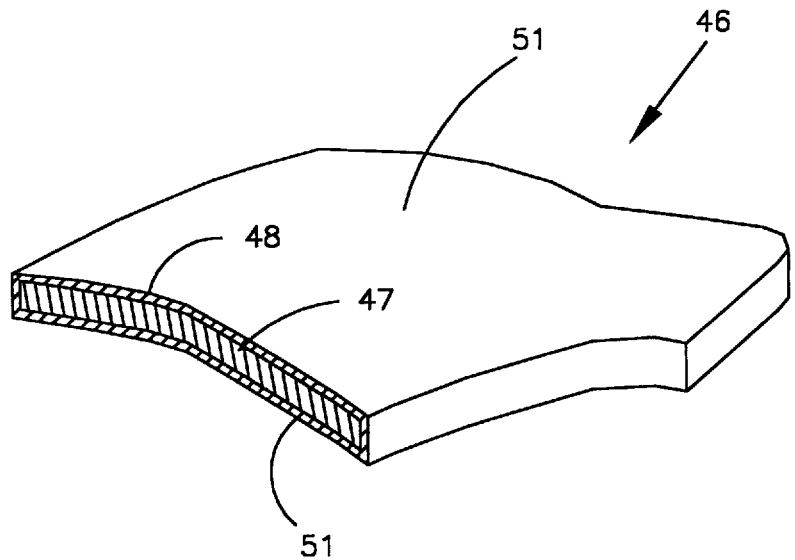
FIG. 3 is an isometric view, partially cross sectioned, of a sorbent particle for use in the method of the present invention.

As an alternative to the foregoing, a large external surface area for interacting with mercury or other pollutants in the flue gas can be achieved by selecting a support material or particle and coating the support material or particle with a thin layer of sorbent. The support particle preferably has a shape with a surface-to-volume ratio much higher than a spherical particle with the same volume. Such a structure is illustrated in FIG. 3 where a particulate structure or sorbent particle 46 is shown formed from a substructural or support particle 47. The effective aerodynamic particle diameter of support particle 47 is less than 100 microns and preferably between 0.1 to 40 microns. This relatively small size permits sorbent particle 46 to be injected into flue gas traveling through system 11 and ensures that the sorbent particle remains suspended in the gas stream.

Support particle 47 has a external surface-to-volume ratio ranging from 10 to 10,000 and preferably from 100 and 1,000 times that of a spherical particle of the same volume. An example of a suitable inert material for support particle 47 is a naturally occurring aluminum silicate mineral flake. The sheet-like shape of these flakes permits particle 47 to have a surface-to-volume ratio, also referred to herein as a surface area to volume ratio, many times greater than the surface-to-volume ratio of a spherical particle of the same volume. The aggregate outer surface area of such a geometry is hundreds to thousands of times greater than the aggregate outer surface area of an equal mass of ground activated carbon particles. The particle or relatively thin flake 47 has a thickness ranging from 0.01 to 10 microns and preferably between 0.01 and 0.1 micron. The aluminum silicate material of support particle 47 has little adsorption affinity for mercury. Each support particle 47 has an outer surface 48.

Particle 47 of sorbent 46 is coated with a thin layer 51 of a sorbent material suitable for reacting with pollutants such as vapor phase air contaminants or toxics to remove the toxics from flue gas when sorbent particle 46 is injected therein. A carbon based sorbent layer 51 is particularly suited for reacting with and removing mercury from flue gas. Alternatively, the sorbent layer or coating 51 can be a layer of any metal which can amalgamate with mercury. Examples of such metals include gold, silver and selenium. Sorbent layer 51 has a thickness ranging from 1 to 10,000 and preferably between 10 and 1,000 angstroms.

Layer 51 can be adhered to outer surface 48 of support particle 47 in any suitable manner. In one method for manufacture of sorbent particle 46, sorbent layer 51 is formed on outer surface 48 by pyrolyzing hydrocarbons on the surface 48 to form carbon. In this manufacturing method, aluminum silicate flakes 47 are heated to high temperatures ranging from 300° to 1,000° F. and preferably from 400° to 800° F. in an organic vapor such as benzene, gasoline, propylene or methane under reducing conditions to form a layer 51 of carbon based material.

In operation and use, a plurality of sorbent particles 46 are injected into the flue gas from boiler 12 upstream of ESP 22 and baghouse 24 in the manner discussed above. As sorbent particles 46 travel with the flue gas, the trace amounts of mercury in the flue gas react and adhere to sorbent coating 51 on particle 47. The captured mercury is thus removed from system 11 when sorbent particles 46 are discharged from particulate control device 22 or 24.

The relatively large surface area of each sorbent particle 46 provides for an increased mass transfer area for each unit mass of sorbent particles 46 and thus permits high percentages of mercury to be removed from the flue gas. Since the sorbent particles 46 have only a thin outer coating of sorbent material, the ratio of sorbent used to mercury absorbed is significantly reduced in comparison to currently used solid activated carbon particles. Accordingly, wastage of expensive sorbent is minimized.

Aluminum silicate flakes 47 permit sorbent particles 46 to be used as an effective precoat for baghouse 24 in the method of the present invention. This precoat of flake-like sorbent particles 46 can be layered on filter bags 28 either prior to or contemporaneous with the flow of flue gas through system 11. Sorbent particles 46 form a fluffy, high permeability dust cake on filter bags 28 which collects mercury as the flue gas travels through baghouse 24.

Figure 4:
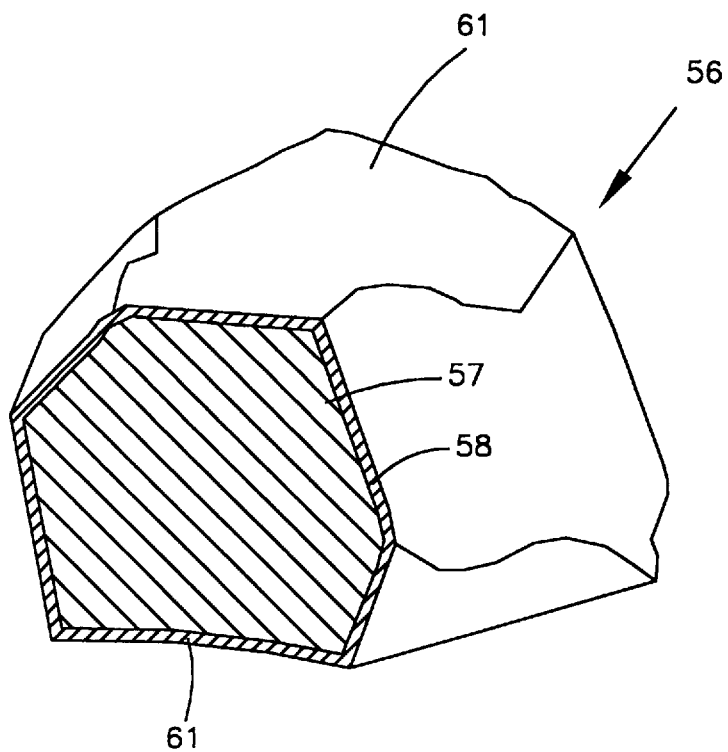
FIG. 4 is an isometric view, partially cross sectioned, of another embodiment of a sorbent particle for use in the method of the present invention.

It should be further appreciated that the sorbent coated particles described herein can have other embodiments and be within the scope of the present invention. For example as shown in FIG. 4, a particulate structure or sorbent particle 56 can be provided which includes a substructural or support particle in the form of a fly ash particle 57 having an outer surface 58. Fly ash particle 57 is somewhat spherical in shape and has an aerodynamic particle diameter which is less than 100 microns and preferably between 0.1 to 40 microns. A thin layer 61 of any suitable sorbent material such as a carbon based material or gold is disposed on outer surface 58 of inert support particle 57. Sorbent layer 61 can be adhered to fly ash particle 57 in any suitable manner such as by pyrolysis as described above.

In operation and use, sorbent particles 56 can be utilized in system 11 in the same manner as discussed above with respect to sorbent particles 46. Although the sorbent particles 56 have a lower external surface-to-volume ratio than the aluminum silicate flakes 47 of sorbent particle 46, fly ash particles are available at almost no cost and thus larger amounts of sorbent particles 56 can be used to increase the aggregate mass transfer area for mercury removal.

It should be appreciated that a pollutant removal system having sorbent particles 46 or 56 injected upstream of only ESP 22 or baghouse 24 would be within the scope of the present invention. Further, a pollutant removal system having only a single particulate control device, whether it be an ESP or a baghouse, and having sorbent particles 46 or 56 injected into flue gas upstream of that control device is also contemplated hereby. In addition, although the method and system hereof have been described in reference to coal-fired boilers, it should be appreciated that they are readily applicable to any combustion facility that already has a moderate-to-high efficiency particulate collection device. Such facilities further include metallurgical processes, municipal waste incinerators, cement kilns and hazardous waste incinerators. Sorbent particles 46 and 56 and the method and system described herein can also be used in other gas streams such as natural gas streams from wells and be within the scope of the present invention.

From the foregoing, it can be seen that a new and improved method has been provided for removing vapor phase air toxics such as mercury from flue gas or other gas streams. The method maximizes the external sorbent area available for reacting with mercury in the flue gas. As such, the method improves sorbent utilization and thereby reduces the amount of sorbent injected into the flue gas. The method utilizes a sorbent particle having a support particle coated with a thin layer of sorbent material for injection into the flue gas stream. The support particle is formed from a relatively inexpensive material. It is desirable that the support particle have a high outer surface area to volume ratio. A method for manufacture of a sorbent particle of the above character is provided.

What is claimed is:

1. A sorbent particle for injection into a gas stream to remove vapor phase contaminants from the gas stream prior to collection in a downstream particle collector comprising a support particle having an outer surface and a size for permitting the support particle to be suspended for travel in the gas stream to the downstream particle collector, the support particle having the shape of a flake and an outer surface area to volume ratio ranging from 10 to 10,000 times greater than the outer surface area to volume ratio of a spherical particle having the same volume as the support particle and a layer of sorbent material disposed on the outer surface of the support particle for reacting with the vapor phase contaminants whereby the support particle is suspended for travel in the gas stream to react with and remove vapor phase contaminants in the gas stream prior to collection in the downstream particle collector and whereby such support particle having the shape of a flake and such outer surface area to volume ratio provides an increased mass transfer area so as to permit high percentages of vapor phase contaminants to be removed from the gas stream.

2. The sorbent particle of claim 1 wherein the support particle is made from an inert material.

3. The sorbent particle of claim 2 wherein the support particle has a size for permitting the support particle to be suspended for travel in a gas stream having a velocity not greater than 150 ft/sec.

4. The sorbent particle of claim 1 wherein the layer of sorbent material has a thickness ranging from 1 to 10,000 angstroms.

5. The sorbent particle of claim 1 wherein the flake has a thickness ranging from 0.01 to 10 microns.

6. The sorbent particle of claim 1 wherein the support particle is aluminum silicate.

7. The sorbent particle of claim 1 wherein the sorbent material is a substance suitable for removing mercury from the flue gas.

8. A method for manufacture of a sorbent particle for injection into a gas stream to remove vapor phase contaminants from the gas stream prior to collection in a downstream particle collector comprising the steps of selecting a support particle having an outer surface and a size for permitting the support particle to be suspended for travel in the gas stream to the downstream particle collector and forming a layer of sorbent material on the outer surface of the support particle for reacting with and removing vapor phase contaminants in the gas stream prior to collection in the downstream particle collector, the forming step including pyrolyzing hydrocarbons on the outer surface of the support particle.

9. The method of claim 8 wherein the pyrolyzing step includes heating the support particle under reducing conditions.

* * * * *